United States Patent
Tanaka

(10) Patent No.: US 11,454,645 B2
(45) Date of Patent: Sep. 27, 2022

(54) INERTIAL SENSOR, ELECTRONIC INSTRUMENT, AND VEHICLE

(71) Applicant: Seiko Epson Corporation, Tokyo (JP)

(72) Inventor: Satoru Tanaka, Chino (JP)

(73) Assignee: Seiko Epson Corporation

( * ) Notice: Subject to any disclaimer, the term of this patent is extended or adjusted under 35 U.S.C. 154(b) by 275 days.

(21) Appl. No.: 16/908,817

(22) Filed: Jun. 23, 2020

(65) Prior Publication Data

US 2020/0400713 A1 Dec. 24, 2020

(30) Foreign Application Priority Data

Jun. 24, 2019 (JP) .............................. JP2019-116778

(51) Int. Cl.
*G01P 15/125* (2006.01)
*G05B 15/02* (2006.01)
*B60R 16/02* (2006.01)

(52) U.S. Cl.
CPC ............ *G01P 15/125* (2013.01); *B60R 16/02* (2013.01); *G05B 15/02* (2013.01)

(58) Field of Classification Search
CPC .................................................... G01P 15/125
USPC ....................................................... 73/514.32
See application file for complete search history.

(56) References Cited

U.S. PATENT DOCUMENTS

| | | |
|---|---|---|
| 5,488,864 A | 2/1996 | Stephan |
| 6,935,175 B2 | 8/2005 | Eskridge et al. |
| 2010/0024553 A1 | 2/2010 | Classen et al. |
| 2013/0263662 A1 | 10/2013 | Tanaka |
| 2015/0241466 A1* | 8/2015 | Tanaka ................. G01P 15/125 73/514.32 |
| 2018/0346321 A1 | 12/2018 | Takubo et al. |
| 2019/0025338 A1 | 1/2019 | Matsuura |
| 2019/0063924 A1 | 2/2019 | Tanaka |

FOREIGN PATENT DOCUMENTS

| | | |
|---|---|---|
| CN | 103364589 A | 10/2013 |
| CN | 108700612 A | 10/2018 |
| EP | 2100151 B1 | 3/2017 |
| JP | H08-220134 A | 8/1996 |
| JP | 2013-217721 A | 10/2013 |
| JP | 2018-202556 A | 12/2018 |
| JP | 2019-045172 A | 3/2019 |
| JP | 6897663 B2 | 7/2021 |

* cited by examiner

*Primary Examiner* — Joseph Chang
(74) *Attorney, Agent, or Firm* — Harness, Dickey & Pierce, P.L.C.

(57) ABSTRACT

An inertial sensor includes a movable element including a first movable section and a second movable section, a first detection electrode, and a first dummy electrode. The first movable section has a first section, a second section that is farther from the swing axis than the first section, and a third section disposed between the first section and second section. The first section of the first movable section has a first opening and the third section of the first movable section has a second opening. An opening ratio of the first opening to the first section of the first movable section is smaller than an opening ratio of the second opening to the third section of the first movable section.

15 Claims, 8 Drawing Sheets

INERTIAL SENSOR, ELECTRONIC INSTRUMENT, AND VEHICLE

The present application is based on, and claims priority from JP Application Serial Number 2019-116778, filed Jun. 24, 2019, the disclosure of which is hereby incorporated by reference herein in its entirety.

BACKGROUND

1. Technical Field

The present disclosure relates to an inertial sensor, an electronic instrument, and a vehicle.

2. Related Art

For example, an inertial sensor described in JP-A-2019-45172 is an acceleration sensor capable of detecting acceleration in an axis-Z direction and includes a substrate, a movable element that performs seesaw swing relative to the substrate around a swing axis extending along an axis-Y direction, and a detection electrode provided on the substrate. The movable element includes a first movable section and a second movable section that are so provided as to sandwich the swing axis and differ in rotational moment around the swing axis from each other. The detection electrode includes a first detection electrode so disposed on the substrate as to face the first movable section and a second detection electrode so disposed on the substrate as to face the second movable section.

When acceleration in the axis-Z direction acts on the inertial sensor having the configuration described above, the movable element performs the seesaw swing around the swing axis, and the capacitance between the first movable section and the first detection electrode and the capacitance between the second movable section and the second detection electrode change accordingly in opposite phases. The acceleration in the axis-Z direction can therefore be detected based on the changes in the capacitance. In the inertial sensor described in JP-A-2019-45172, to reduce air resistance that occurs when the movable element swings to suppress damping of the movable element for desired frequency characteristics thereof, a plurality of through holes are uniformly formed across the entire region of the movable element.

Formation of a plurality of through holes uniformly across the entire region of the movable element, however, reduces the area of the portion where the first movable section faces the first detection electrode and the area of the portion where the second movable section faces the second detection electrode at the sacrifice of suppression of the damping for the desired frequency characteristics of the movable element, resulting in a decrease in the capacitance between the movable sections and the detection electrodes and in turn a decrease in the acceleration detection sensitivity. That is, the inertial sensor described in JP-A-2019-45172 has a difficulty in providing excellent detection sensitivity with a desired frequency band ensured.

SUMMARY

An inertial sensor described in an embodiment includes, provided that axes X, Y, and Z are three axes perpendicular to one another, a substrate, a movable element that swings around a swing axis extending along the axis Y, and an electrode that is disposed on the substrate and overlaps with the movable element in a plan view along the axis-Z direction. The movable element includes a first movable section and a second movable section so provided as to sandwich the swing axis in the plan view along the axis-Z direction. The first movable section includes a symmetrical section that is so provided that the symmetrical section and the second movable section are symmetrical with respect to the swing axis in the plan view along the axis-Z direction and an asymmetrical section that is farther from the swing axis than the symmetrical section, with rotational moment of the first movable section around the swing axis being greater than rotational moment of the second movable section around the swing axis. The electrode includes a first detection electrode that is so provided as to overlap with the symmetrical section of the first movable section in the plan view along the axis-Z direction and a first dummy electrode that is so provided as to overlap with the symmetrical section and the asymmetrical section of the first movable section on a side farther from the swing axis than the first detection electrode and has the same potential as potential at the movable element. The symmetrical section has a first opening provided in a first section that overlaps with the first detection electrode in the plan view along the axis-Z direction and a second opening provided in a second section that overlaps with the first dummy electrode in the plan view along the axis-Z direction. An opening ratio of the first opening to the first section is smaller than an opening ratio of the second opening to the second section.

DESCRIPTION OF EXEMPLARY EMBODIMENTS

An inertial sensor, an electronic instrument, and a vehicle according to the present disclosure will be described below in detail based on embodiments shown in the accompanying drawings.

First Embodiment

Figure 1:
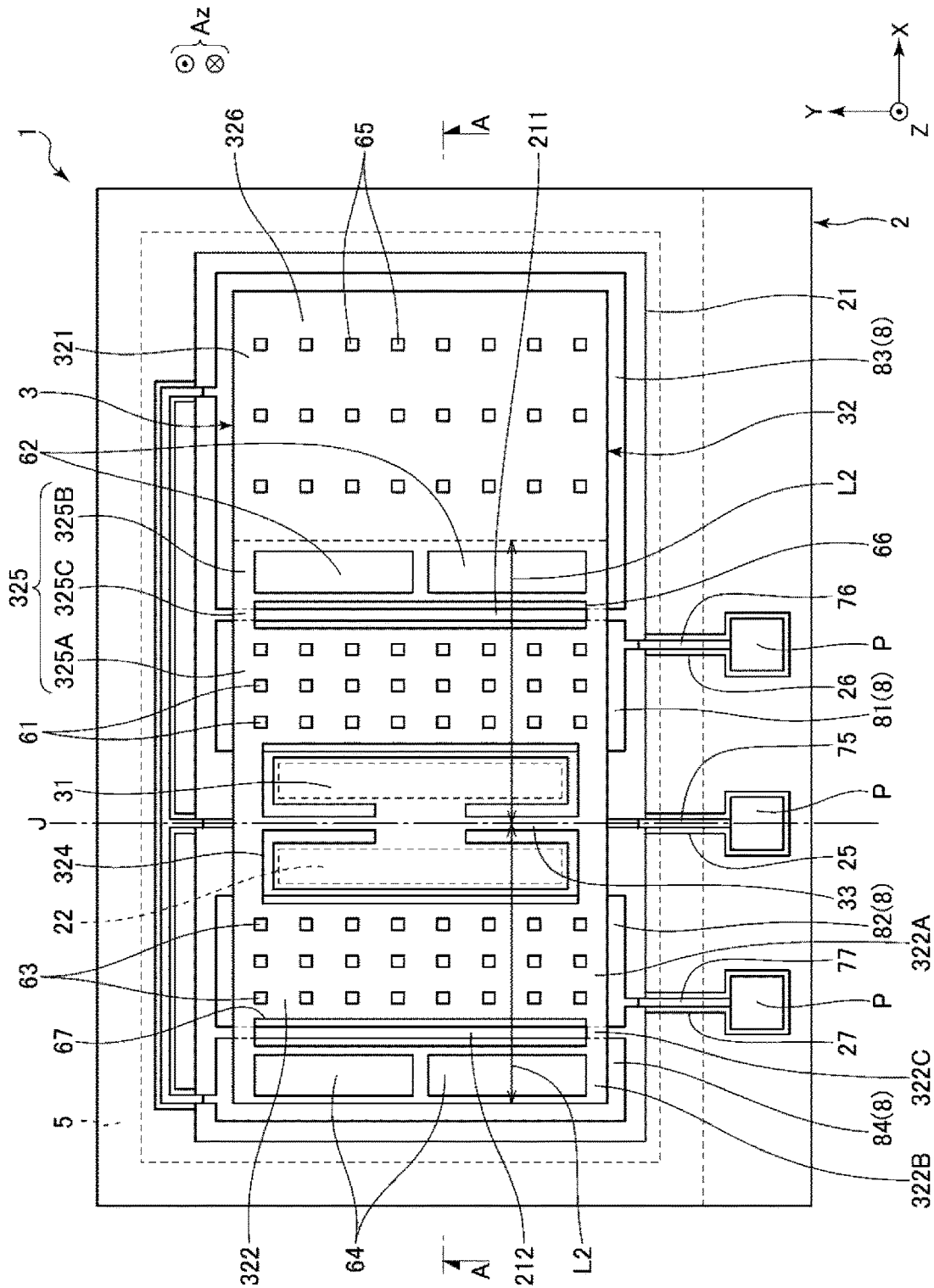
FIG. 1 is a plan view showing an inertial sensor according to a first embodiment.
Figure 2:
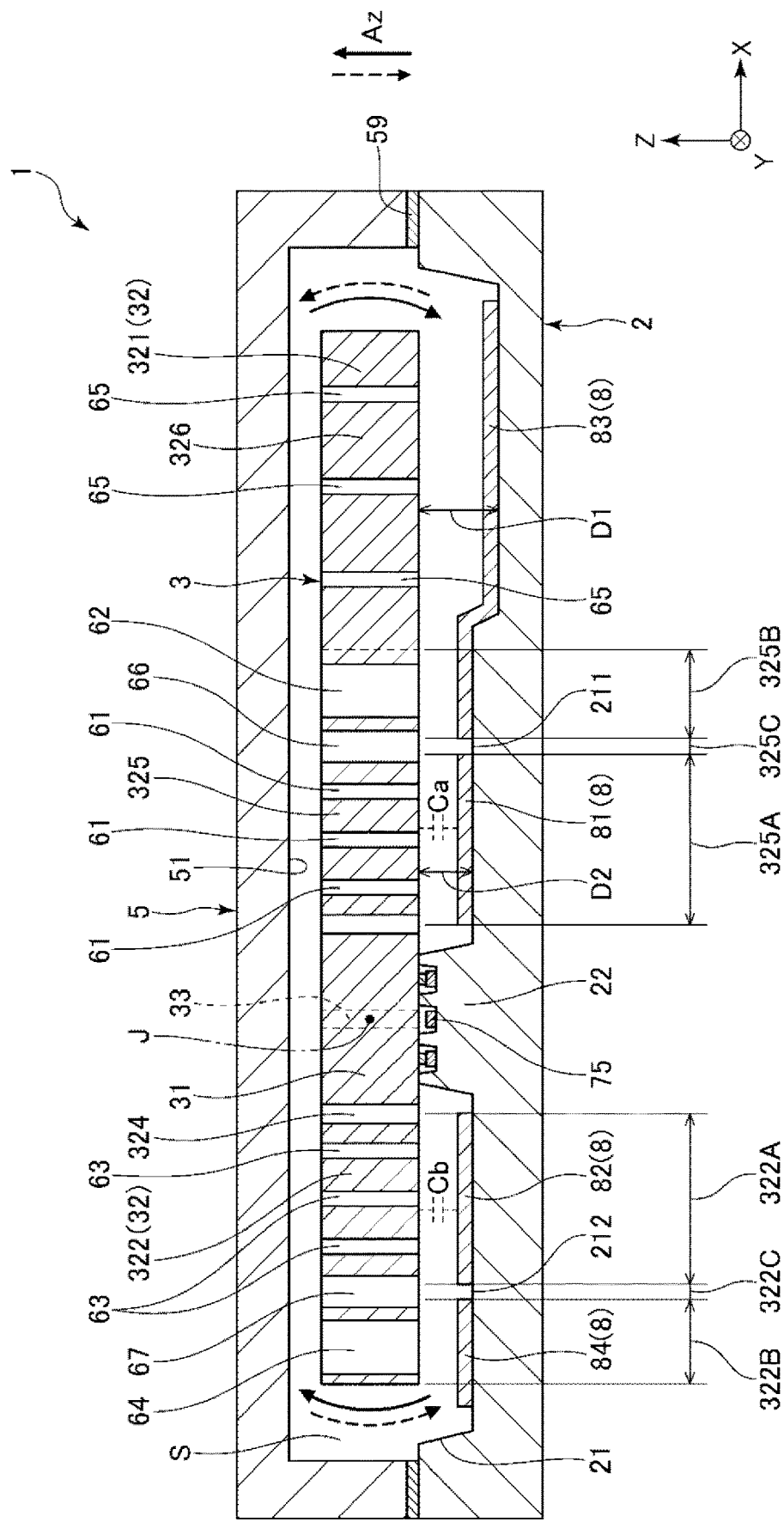
FIG. 2 is a cross-sectional view of the inertial sensor taken along the line A-A in FIG. 1.

FIG. 1 is a plan view showing an inertial sensor according to a first embodiment. FIG. 2 is a cross-sectional view of the inertial sensor taken along the line A-A in FIG. 1.

In the following description, three axes perpendicular to one another, axes X, Y, and Z are drawn for convenience of the description. The direction along the axis X, that is, the direction parallel to the axis X is also called an "axis-X direction," the direction along the axis Y, that is, the direction parallel to the axis Y is also called an "axis-Y direction," and the direction along the axis Z, that is, the direction parallel to the axis Z is also called an "axis-Z direction." The side facing the front end of the arrow of each of the axes is also called a "positive side," and the side opposite the positive side is also called a "negative side." The positive side of the axis-Z direction is also called "upper," and the negative side of the axis-Z direction is also called "lower." In the specification of the present application, the state expressed by the term "perpendicular" includes a state comparable to "perpendicular" in a technical common sense, specifically, a state in which two lines intersect each other at 90° and also a state in which two lines intersect each other at an angle that slightly deviates from 90°, for example, an angle that falls within 90°± about 5°. Similarly, the state expressed by the term "parallel" includes a state comparable to "parallel" in a technical common sense, specifically, a state in which the angle between two lines is 0° and also a state in which the angle between two lines deviates from 0° by about ±5°.

An inertial sensor 1 shown in FIG. 1 is an acceleration sensor that detects acceleration Az in the axis-Z direction. The inertial sensor 1 includes a substrate 2, a sensor device 3, which is disposed on the substrate 2, and a lid 5, which is bonded to the substrate 2 and covers the sensor device 3.

The substrate 2 has a recess 21, which opens toward the upper side, as shown in FIG. 1. In the plan view along the axis-Z direction, the recess 21 is so formed as to accommodate the sensor device 3 and to be larger than the sensor device 3. The substrate 2 includes a mount 22, which protrudes from the bottom surface of the recess 21, as shown in FIG. 2. The sensor device 3 is bonded to the upper surface of the mount 22. The substrate 2 has grooves 25, 26, and 27, which open via the upper surface of the substrate 2, as shown in FIG. 1.

The substrate 2 can, for example, be a glass substrate made of a glass material containing an alkali metal ion that is a movable ion, such as Na⁺, for example, borosilicate glass, such as Pyrex glass and Tempax glass (both are registered trademark). The substrate 2 is, however, not limited to a specific substrate and may instead, for example, be a silicon substrate or a ceramic substrate.

The substrate 2 is provided with an electrode 8, as shown in FIG. 1. The electrode 8 includes a first detection electrode 81, a second detection electrode 82, a first dummy electrode 83, and a second dummy electrode 84, which are disposed on the bottom surface of the recess 21 and overlap with the sensor device 3 in the plan view along the axis-Z direction. The substrate 2 further includes wiring lines 75, 76, and 77 disposed in the grooves 25, 26, and 27, respectively.

One end portion of each of the wiring lines 75, 76, and 77 functions as an electrode pad P, which is exposed to the region outside the lid 5 in the plan view and electrically couples the inertial sensor 1 to an external apparatus. The wiring line 75 is electrically coupled to the sensor device 3 and the first and second dummy electrodes 83, 84. The wiring line 76 is electrically coupled to the first detection electrode 81. The wiring line 77 is electrically coupled to the second detection electrode 82. That is, the first and second dummy electrodes 83, 84 have the same potential as that at a movable element 32.

The lid 5 has a recess 51, which opens via the lower surface of the lid 5, as shown in FIG. 2. The lid 5 is so bonded to the upper surface of the substrate 2 as to accommodate the sensor device 3 in the recess 51. The lid 5 and the substrate 2 form an internal accommodation space S, which accommodates the sensor device 3. It is preferable that the accommodation space S is a hermetically sealed space and is filled with an inert gas, such as nitrogen, helium, and argon, and that the pressure of the inert gas that fills the accommodation space S is substantially equal to the atmospheric pressure at the temperature at which the inertial sensor 1 is used (from about −40° C. to 125° C.). It is, however, noted that the accommodation space S does not necessarily have a specific atmosphere and may be, for example, under pressure higher or lower than the atmospheric pressure.

The lid 5 can, for example, be a silicon substrate. It is, however, noted that the lid 5 is not necessarily formed of a specific substrate and may, for example, be formed of a glass substrate or a ceramic substrate. The method for bonding the substrate 2 and the lid 5 to each other is not limited to a specific method and may be selected as appropriate in accordance with the materials of the substrate 2 and the lid 5. For example, the method can be anodic bonding, activation bonding in which bonding surfaces activated by plasma radiation are bonded to each other, bonding using a bonding material, such as glass frit, and diffusion bonding in which a metal film deposited on the upper surface of the substrate 2 and a metal film deposited on the lower surface of the lid 5 are bonded to each other. In the present embodiment, the substrate 2 and the lid 5 are bonded to each other with glass frit 59, which is made of low-melting-point glass.

The sensor device 3 is formed, for example, by etching an electrically conductive silicon substrate into which an impurity, such as phosphorus (P), boron (B), and arsenic (As), has been doped, particularly, patterning the silicon substrate in a Bosch process, which is a deep-groove etching technology. The sensor device 3 includes an H-shaped fixed section 31, which is bonded to the upper surface of the mount 22, the movable element 32, which is swingable relative to the fixed section 31 around a swing axis J extending along the axis Y, and swing beams 33, which couple the fixed section 31 to the movable element 32, as shown in FIG. 1. The fixed section 31 is bonded to the mount 22, for example, in anodic bonding.

The movable element 32 has an oblong shape having a longitudinal direction that coincides with the axis-X direction in the plan view along the axis-Z direction. The movable element 32 includes a first movable section 321 and a second movable section 322 so disposed as to sandwich the swing axis J extending along the axis Y in the plan view along the axis-Z direction. The first movable section 321 is located on the positive side of the swing axis J in the axis-X direction, and the second movable section 322 is located on the negative side of the swing axis J in the axis-X direction. The first movable section 321 is longer than the second movable section 322 in the axis-X direction, and the rotational moment of the first movable section 321 around the swing axis J produced when the acceleration Az acts on the inertial sensor 1 is greater than that of the second movable section 322.

The difference in the rotational moment causes the movable element 32 to perform seesaw swing around the swing axis J when the acceleration Az acts on the inertial sensor 1. The seesaw swing means that displacement of the first movable section 321 toward the positive side of the axis-Z direction causes displacement of the second movable section 322 toward the negative side of the axis-Z direction, and that conversely, displacement of the first movable section 321 toward the negative side of the axis-Z direction causes displacement of the second movable section 322 toward the positive side of the axis-Z direction.

The movable element 32 has an opening 324 located between the first movable section 321 and the second movable section 322. The fixed section 31 and the swing beams 33 are disposed in the opening 324. Since the fixed section 31 and the swing beams 33 are thus disposed inside the movable element 32, the size of the sensor device 3 can be reduced.

Now, return to the description of the electrode 8 disposed on the bottom surface of the recess 21. In the plan view along the axis-Z direction, the first detection electrode 81 is so disposed as to overlap with a base portion of the first movable section 321, and the second detection electrode 82 is so disposed as to overlap with a base portion of the second movable section 322, as shown in FIGS. 1 and 2. The base portion used herein means a portion facing the swing beams 33. The first and second detection electrodes 81, 82 are provided symmetrically with respect to the swing axis J in the plan view along the axis-Z direction.

The first dummy electrode 83 is located on the positive side of the first detection electrode 81 in the axis-X direction and so disposed as to overlap with a front end portion of the first movable section 321, and the second dummy electrode 84 is located on the negative side of the second detection electrode 82 in the axis-X direction and so disposed as to overlap with a front end portion of the second movable section 322. That is, the first dummy electrode 83 faces a portion of the first movable section 321 that is a portion farther from the swing axis J than the first detection electrode 81, and the second dummy electrode 84 faces a portion of the second movable section 322 that is a portion farther from the swing axis J than the second detection electrode 82.

Providing the first and second dummy electrodes 83, 84, which have the same potential as that at the movable element 32, in regions that surround the first and second detection electrode 81, 82, as described above, allows suppression of exposure of the bottom surface of the recess 21 in the region where the bottom surface overlaps with the movable element 32. The configuration described above effectively prevents the bottom surface of the recess 21 from being charged resulting from the movement of the alkali metal ion (Na$^+$) in the substrate 2 and further effectively prevents unnecessary electrostatic attraction from being produced between the bottom surface of the recess 21 and the movable element 32 resulting from the charged bottom surface. Swing motion of the movable element 32 induced by force other than the acceleration Az, which is the detection target, can therefore be effectively suppressed, and degradation in characteristics in accordance with which the acceleration Az is detected can in turn be suppressed.

Although not shown, when the inertial sensor 1 is driven, drive voltage is applied to the sensor device 3 via the wiring line 75. To this end, the first detection electrode 81 is coupled to a QV amplifier via the wiring line 76, and the second detection electrode 82 is coupled to another QV amplifier via the wiring line 77. As a result, capacitance Ca is formed between the first movable section 321 and the first detection electrode 81, and capacitance Cb is formed between the second movable section 322 and the second detection electrode 82.

When the acceleration Az acts on the inertial sensor 1, the movable element 32 performs seesaw swing around the swing axis J (the swing motion is hereinafter also called "detection vibration"). The seesaw swing of the movable element 32 changes the gap between the first movable section 321 and the first detection electrode 81 and the gap between the second movable section 322 and the second detection electrode 82 in opposite phases, and the capacitance Ca and the capacitance Cb change in opposite phases accordingly. The inertial sensor 1 can therefore detect the acceleration Az based on the difference between the capacitance Ca and the capacitance Cb (amount of change in capacitance).

The configuration of the inertial sensor 1 has been briefly described. The configuration of the movable element 32 will next be described in detail. The movable element 32 includes the first movable section 321 and the second movable section 322 so disposed as to sandwich the swing axis J, the first movable section 321 is longer than the second movable section 322 in the axis-X direction, and the rotational moment of the first movable section 321 around the swing axis J produced when the acceleration Az acts on the inertial sensor 1 is greater than that of the second movable section 322, as described above.

The first movable section 321 includes a symmetrical section 325, which is so provided that the symmetrical section 325 and the second movable section 322 are symmetrical with respect to the swing axis J in the plan view along the axis-Z direction, and an asymmetrical section 326, which is farther from the swing axis J than the symmetrical section 325 and so provided that the asymmetrical section 326 and the second movable section 322 are asymmetrical with respect to the swing axis J in the plan view along the axis-Z direction, as shown in FIG. 1. Let L2 be the length of the second movable section 322 that is the length measured from the swing axis J, and the line where the length of the first movable section 321 that is the length measured from the swing axis J is equal to the length L2 is the boundary between the symmetrical section 325 and the asymmetrical section 326. Out of the first movable section 321, the portion on one side of the line that is the side facing the swing axis J is the symmetrical section 325, and the portion opposite the swing axis J with respect to the symmetrical section 325 is the asymmetrical section 326. The asymmetrical section 326 functions as a torque generator for causing the rotational moment of the first movable section 321 around the swing axis J to be greater than the rotational moment of the second movable section 322 around the swing axis J.

The state in which the second movable section 322 and the symmetrical section 325 are symmetrical with respect to the swing axis J means that the outer shape of the second movable section 322 and the outer shape of the symmetrical section 325 are symmetrical with respect to the swing axis J in the plan view along the axis-Z direction. The state expressed by the term "symmetrical" includes a state in which the outer shape of the second movable section 322 and the outer shape of the symmetrical section 325 are fully symmetrical and, for example, a state in which the outer shapes described above contain possible manufacturing and design errors.

The description of the electrode 8 is now resumed. In the plan view along the axis-Z direction, the first detection electrode 81 is so provided as to overlap with the symmetrical section 325 of the first movable section 321, and the first dummy electrode 83 is so provided as to overlap with the symmetrical section 325 and the asymmetrical section 326 of the first movable section 321. Further, in the plan view along the axis-Z direction, the second detection electrode 82 is so provided as to overlap with the base portion of the second movable section 322, and the second dummy electrode 84 is so provided as to overlap with the front end portion of the second movable section 322, that is, the portion farther from the swing axis J than the second detection electrode 82.

The recess 21 is so formed that a portion that overlaps with the asymmetrical section 326 in the plan view along the axis-Z direction is deeper than the other portion, as shown in FIG. 2. That is, a separation distance D1 from the asymmetrical section 326 to the substrate 2 is greater than a separation distance D2 from the symmetrical section 325 and the second movable section 322 to the substrate 2. Contact between the movable element 32 and the substrate 2 can thus be avoided with the separation distance between the first movable section 321 and the first detection electrode 81 and the separation distance between the second movable section 322 and the second detection electrode 82 reduced to increase the capacitance Ca and Cb.

The description of the first movable section 321 is now resumed. A portion of the symmetrical section 325 that is the portion that overlaps with the first detection electrode 81 in the plan view along the axis-Z direction is called a base end section 325A as a first section, a portion of the symmetrical section 325 that is the portion that overlaps with the first dummy electrode 83 in the plan view along the axis-Z direction is called a front end section 325B as a second section, and a portion of the symmetrical section 325 that is the portion that is located between the base end section 325A and the front end section 325B and overlaps with a portion 211, which is a bottom surface portion of the recess 21 that is the portion exposed via the space between the first detection electrode 81 and the first dummy electrode 83, is called an intermediate section 325C, as shown in FIG. 1. The symmetrical section 325 has openings 61 as a first opening formed in the base end section 325A, openings 62 as a second opening formed in the front end section 325B, and an opening 66 formed in the intermediate section 325C. The openings 61, 62, and 66 are each formed of a through hole that passes through the movable element 32 in the axis-Z direction, which is the thickness direction of the movable element 32.

In the present embodiment, the openings 61 each have a substantially square opening shape and are formed of a plurality of openings arranged in a matrix along the axis-X and axis-Y directions. The openings 62 each have a substantially oblong opening shape having a longitudinal direction that coincides with the axis-Y direction and are formed of two openings arranged in a single row along the axis-Y direction. The opening 66 has a substantially oblong opening shape having a longitudinal direction that coincides with the axis-Y direction and is formed of one opening in a central portion of the symmetrical section 325 in the axis-Y direction. It is, however, noted that the opening shapes of the openings 61, 62, and 66 are not each limited to a specific shape, the numbers of openings 61, 62, and 66 are not each limited to a specific number, and the arrangement of the openings 61, 62, and 66 is not limited to a specific arrangement.

The openings 61, 62, and 66 each have the function of reducing air-resistance-induced damping of the movable element 32. The inertial sensor 1 can therefore ensure a desired frequency band. The opening 66 further has the function of reducing the area of the portion where the first movable section 321 faces the section 211 in addition to the function of reducing the damping induced by the air resistance. The opening 66 can therefore reduce unnecessary electrostatic attraction produced between the section 211 and the first movable section 321. Swing motion of the movable element 32 induced by force other than the acceleration Az, which is the detection target, can therefore be effectively suppressed, and degradation in characteristics in accordance with which the acceleration Az is detected can in turn be suppressed.

An opening ratio R1 (%) of the openings 61 to the base end section 325A is smaller than an opening ratio R2 (%) of the openings 62 to the front end section 325B. That is, R1<R2 is satisfied. The opening ratio R1 is expressed by {(total area of all openings 61)/(area of base end section 325A)}×100 in the plan view along the axis-Z direction, and the opening ratio R2 is expressed by {(total area of all openings 62)/(area of front end section 325B)}×100 in the plan view along the axis-Z direction. According to the configuration described above, an inertial sensor 1 capable of providing excellent detection sensitivity with a desired frequency band ensured is achieved. Specifically, forming the openings 61 and 62 in the symmetrical section 325 reduces the air resistance that occurs when the movable element 32 swings, whereby the damping of the movable element 32 can be reduced. When R1<R2 is satisfied, the area of the portion where the first movable section 321 faces the first detection electrode 81 can be sufficiently increased, whereby the capacitance Ca formed between the first movable section 321 and the first detection electrode 81 can be sufficiently increased. The sensitivity at which the acceleration Az is detected can therefore be further improved.

The opening ratios R1 and R2 only need to satisfy R1<R2. It is, however, preferable that $0.1 \leq R1/R2 \leq 0.8$ is satisfied, more preferably that $0.2 \leq R1/R2 \leq 0.5$ is satisfied. In this case, the effect described above can be more noticeably provided. The opening ratio R1 is not limited to a specific value. It is, however, preferable that $5\% \leq R1 \leq 45\%$ is satisfied, more preferably that $10\% \leq R1 \leq 30\%$ is satisfied. The capacitance Ca formed between the first movable section 321 and the first detection electrode 81 can be sufficiently increased, whereby the sensitivity at which the acceleration Az is detected can be further improved. On the other hand, the opening ratio R2 is not limited to a specific value. It is, however, preferable that $50\% \leq R2 \leq 90\%$ is satisfied, more preferably that $60\% \leq R1 \leq 80\%$ is satisfied. The air resistance that occurs at the front end section 325B can therefore be sufficiently reduced with the mechanical strength thereof ensured. The damping of the movable element 32 can therefore be more effectively reduced, whereby a desired frequency band can be more effectively ensured.

The asymmetrical section 326 of the first movable section 321 has openings 65 as a fifth opening. The openings 65 are each formed of a through hole that passes through the movable element 32 in the axis-Z direction, which is the thickness direction of the movable element 32. In the present embodiment, the openings 65 each have a substantially square opening shape and are formed of a plurality of openings arranged in a matrix along the axis-X and axis-Y directions. It is, however, noted that the opening shape of the openings 65 are not limited to a specific shape, the number of openings 65 is not each limited to a specific number, and the arrangement of the openings 65 is not limited to a specific arrangement.

The openings 65 has the function of reducing the air-resistance-induced damping of the movable element 32, as do the openings 61, 62, and 66 described above. The inertial sensor 1 can therefore ensure a desired frequency band.

An opening ratio R5 (%) of the openings 65 to the asymmetrical section 326 is smaller than the opening ratio R2. That is, R5<R2. The opening ratio R5 is expressed by {(total area of all openings 65)/(area of asymmetrical section 326)}×100 in the plan view along the axis-Z direction. The thus set openings 65 can suppress an excessive decrease in the mass of the asymmetrical section 326 and therefore more effectively provide the aforementioned function as the torque generator. That is, the rotational moment of the first movable section 321 around the swing axis J can be more effectively greater than the rotational moment of the second movable section 322 around the swing axis J. Further, the opening ratio R5 (%) is smaller than the opening ratio R1. That is, R5<R1. The thus set openings 65 can more effectively suppress an excessive decrease in the mass of the asymmetrical section 326 and therefore further effectively provide the aforementioned function as the torque generator. The opening ratio R5 is not limited to a specific value. It is, however, preferable that 5%≤R5≤50% is satisfied, more preferably that 7%≤R1≤40% is satisfied. The mass of the asymmetrical section 326 can therefore be sufficiently ensured, whereby a decrease in the sensitivity at which the acceleration Az is detected can be suppressed. Further, the air resistance that occurs at the asymmetrical section 326 can be sufficiently reduced, and the damping of the movable element 32 can therefore be more effectively reduced, whereby a desired frequency band can be more effectively ensured.

When a preferable opening ratio of 5% is selected as the opening ratio R1, it need hardly be said that an opening ratio R5 smaller than 5% is naturally selected. Similarly, when a preferable opening ratio of 50% is selected as the opening ratio R2, it also need hardly be said that an opening ratio R5 smaller than 50% is selected irrespective of the required condition that the selection range is 5%≤R5≤50%.

The second movable section 322 will then be described. A portion of the second movable section 322 that is the portion that overlaps with the second detection electrode 82 in the plan view along the axis-Z direction is called a base end section 322A as a third section, a portion of the second movable section 322 that is the portion that overlaps with the second dummy electrode 84 in the plan view along the axis-Z direction is called a front end section 322B as a fourth section, and a portion of the second movable section 322 that is the portion that is located between the base end section 322A and the front end section 322B and overlaps with a portion 212, which is a bottom surface portion of the recess 21 that is the portion exposed via the space between the second detection electrode 82 and the second dummy electrode 84, is called an intermediate section 322C. The second movable section 322 has openings 63 as a third opening formed in the base end section 322A, openings 64 as a fourth opening formed in the front end section 322B, and an opening 67 formed in the intermediate section 322C. The openings 63, 64, and 67 are each formed of a through hole that passes through the movable element 32 in the axis-Z direction, which is the thickness direction of the movable element 32.

In the present embodiment, the openings 63 each have a substantially square opening shape and are formed of a plurality of openings arranged in a matrix along the axis-X and axis-Y directions. The openings 64 each have a substantially oblong opening shape having a longitudinal direction that coincides with the axis-Y direction and are formed of two openings arranged in a single row along the axis-Y direction. The opening 67 has a substantially oblong opening shape having a longitudinal direction that coincides with the axis-Y direction and is formed of one opening in a central portion of the second movable section 322 in the axis-Y direction. It is, however, noted that the opening shapes of the openings 63, 64, and 67 are not each limited to a specific shape, the numbers of openings 63, 64, and 67 are not each limited to a specific number, and the arrangement of the openings 63, 64, and 67 is not limited to a specific arrangement.

The openings 63, 64, and 67 each have the function of reducing air-resistance-induced damping of the movable element 32, as do the openings 61, 62, and 66 described above. The inertial sensor 1 can therefore ensure a desired frequency band. The opening 67 further has the function of reducing the area of the portion where the second movable section 322 faces the section 212 in addition to the function of reducing the damping induced by the air resistance. The opening 67 can therefore reduce unnecessary electrostatic attraction produced between the section 212 and the second movable section 322. Swing motion of the movable element 32 induced by force other than the acceleration Az, which is the detection target, can therefore be effectively suppressed, and degradation in characteristics in accordance with which the acceleration Az is detected can in turn be suppressed.

An opening ratio R3 (%) of the openings 63 to the base end section 322A is smaller than an opening ratio R4 (%) of the openings 64 to the front end section 322B. That is, R3<R4 is satisfied. The opening ratio R3 is expressed by {(total area of all openings 63)/(area of base end section 322A)}×100 in the plan view along the axis-Z direction, and the opening ratio R4 is expressed by {(total area of all openings 64)/(area of front end section 322B)}×100 in the plan view along the axis-Z direction. According to the configuration described above, an inertial sensor 1 capable of providing excellent detection sensitivity with a desired frequency band ensured is achieved. Specifically, forming the openings 63 and 64 in the second movable section 322 reduces the air resistance that occurs when the movable element 32 swings, whereby the damping of the movable element 32 can be reduced. When R3<R4 is satisfied, the area of the portion where the second movable section 322 faces the second detection electrode 82 can be sufficiently increased, whereby the capacitance Cb formed between the second movable section 322 and the second detection electrode 82 can be sufficiently increased. The sensitivity at which the acceleration Az is detected can therefore be further improved.

The opening ratios R3 and R4 only need to satisfy R3<R4. It is, however, preferable that 0.1≤R3/R4≤0.8 is satisfied, more preferably that 0.2≤R3/R4≤0.5 is satisfied. In this case, the effect described above can be more noticeably provided. The opening ratio R3 is not limited to a specific value. It is, however, preferable that 5%≤R3≤45% is satisfied, more preferably that 10%≤R3≤30% is satisfied. The capacitance Cb formed between the second movable section 322 and the second detection electrode 82 can be sufficiently increased, whereby the sensitivity at which the acceleration Az is detected can be further improved. On the other hand, the opening ratio R4 is not limited to a specific value. It is, however, preferable that 50%≤R4≤90% is satisfied, more preferably that 60%≤R4≤80% is satisfied. The air resistance that occurs at the front end section 322B can therefore be sufficiently reduced with the mechanical strength thereof ensured. The damping of the movable element 32 can therefore be more effectively reduced, whereby a desired frequency band can be more effectively ensured.

In the plan view along the axis-Z direction, the openings 63 and the openings 61 are provided symmetrically with respect to the swing axis J, the openings 64 and the openings 62 are provided symmetrically with respect to the swing axis J, and the opening 67 and the opening 66 are provided symmetrically with respect to the swing axis J. The balance between the first movable section 321 and the second movable section 322 is therefore improved, whereby the movable element 32 more stably swings around the swing axis J. That is, occurrence of unnecessary vibration other than the seesaw vibration, which is the vibration of the movable element 32 under detection, can be effectively suppressed. It is, however, noted that the openings are not necessarily arranged as described above; The openings 63 and the openings 61 may be asymmetrical with respect to the swing axis J, the openings 64 and the openings 62 may be asymmetrical with respect to the swing axis J, and the opening 67 and the opening 66 may be asymmetrical with respect to the swing axis J.

The inertial sensor 1 has been described. The thus configured inertial sensor 1 includes, provided that the axes X, Y, and Z are three axes perpendicular to one another, the substrate 2, the movable element 32, which swings around the swing axis J extending along the axis Y, and the electrode 8, which is disposed on the substrate 2 and overlaps with the movable element 32 in the plan view along the axis-Z direction, as described above. The movable element 32 includes the first movable section 321 and the second movable section 322 so provided as to sandwich the swing axis J in the plan view along the axis-Z direction. The first movable section 321 includes the symmetrical section 325, which is so provided that the symmetrical section 325 and the second movable section 322 are symmetrical with respect to the swing axis J in the plan view along the axis-Z direction, and the asymmetrical section 326, which is farther from the swing axis J than the symmetrical section 325, and the rotational moment of the first movable section 321 around the swing axis J is greater than that of the second movable section 322. The electrode 8 includes the first detection electrode 81, which is so provided as to overlap with the symmetrical section 325 of the first movable section 321 in the plan view along the axis-Z direction, and the first dummy electrode 83, which is so provided as to overlap with the symmetrical section 325 and the asymmetrical section 326 of the first movable section 321 on the side farther from the swing axis J than the first detection electrode 81 and has the same potential as that at the movable element 32. The symmetrical section 325 has the openings 61, which serve as the first opening provided in the base end section 325A as the first section that overlaps with the first detection electrode 81 in the plan view along the axis-Z direction, and the openings 62, which serve as the second opening provided in the front end section 325B as the second section that overlaps with the first dummy electrode 83 in the plan view along the axis-Z direction. The opening ratio R1 of the openings 61 to the base end section 325A is smaller than the opening ratio R2 of the openings 62 to the front end section 325B.

According to the configuration described above, an inertial sensor 1 capable of providing excellent detection sensitivity with a desired frequency band ensured is achieved. Specifically, forming the openings 61 and 62 in the symmetrical section 325 reduces the air resistance that occurs when the movable element 32 swings, whereby the damping of the movable element 32 can be reduced. When R1<R2 is satisfied, the area of the portion where the first movable section 321 faces the first detection electrode 81 can be sufficiently increased, whereby the capacitance Ca formed between the first movable section 321 and the first detection electrode 81 can be sufficiently increased. The sensitivity at which the acceleration Az is detected is therefore further improved.

The electrode 8 includes the second detection electrode 82, which is so provided as to overlap with the second movable section 322 in the plan view along the axis-Z direction, and the second dummy electrode 84, which is so provided as to overlap with the second movable section 322 on the side farther from the swing axis J than the second detection electrode 82 and has the same potential as that at the movable element 32, as described above. The second movable section 322 includes the openings 63, which serve as the third opening provided in the base end section 322A as the third section that overlaps with the second detection electrode 82 in the plan view along the axis-Z direction, and the openings 64, which serve as the fourth opening provided in the front end section 322B as the fourth section that overlaps with the second dummy electrode 84 in the plan view along the axis-Z direction. The opening ratio R3 of the openings 63 to the base end section 322A is smaller than the opening ratio R4 of the openings 64 to the front end section 322B.

As described above, forming the openings 63 and 64 in the second movable section 322 reduces the air resistance that occurs when the movable element 32 swings, whereby the damping of the movable element 32 can be reduced. When R3<R4 is satisfied, the area of the portion where the second movable section 322 faces the second detection electrode 82 can be sufficiently increased, whereby the capacitance Cb formed between the second movable section 322 and the second detection electrode 82 can be sufficiently increased. The sensitivity at which the acceleration Az is detected is therefore further improved.

Further, the openings 61 and the openings 63 are provided symmetrically with respect to the swing axis J, and the openings 62 and the openings 64 are provided symmetrically with respect to the swing axis J. The balance between the first movable section 321 and the second movable section 322 is therefore improved, whereby the movable element 32 more stably swings around the swing axis J. That is, occurrence of unnecessary vibration other than the seesaw vibration, which is the vibration of the movable element 32 under detection, can be effectively suppressed.

The asymmetrical section 326 has the openings 65 as the fifth opening, as described above. The opening ratio R5 of the openings 65 to the asymmetrical section 326 is smaller than the opening ratio R2 of the openings 62 to the front end section 325B. The thus configured openings 65 can suppress an excessive decrease in the mass of the asymmetrical section 326 and therefore more effectively provide the aforementioned function as the torque generator. That is, the rotational moment of the first movable section 321 around the swing axis J can be more effectively greater than the rotational moment of the second movable section 322 around the swing axis J.

Further, the opening ratio R5 of the openings 65 to the asymmetrical section 326 is smaller than the opening ratio R1 of the openings 61 to the base end section 325A, as described above. The thus configured openings 65 can suppress an excessive decrease in the mass of the asymmetrical section 326 and therefore more effectively provide the aforementioned function as the torque generator.

The separation distance D1 from the asymmetrical section 326 to the substrate 2 is greater than the separation distance D2 from the symmetrical section 325 to the substrate 2, as described above. Contact between the movable element 32 and the substrate 2 can thus be avoided with the separation distance between the first movable section 321 and the first detection electrode 81 and the separation distance between the second movable section 322 and the second detection electrode 82 reduced to increase the capacitance Ca and Cb.

Second Embodiment

Figure 3:
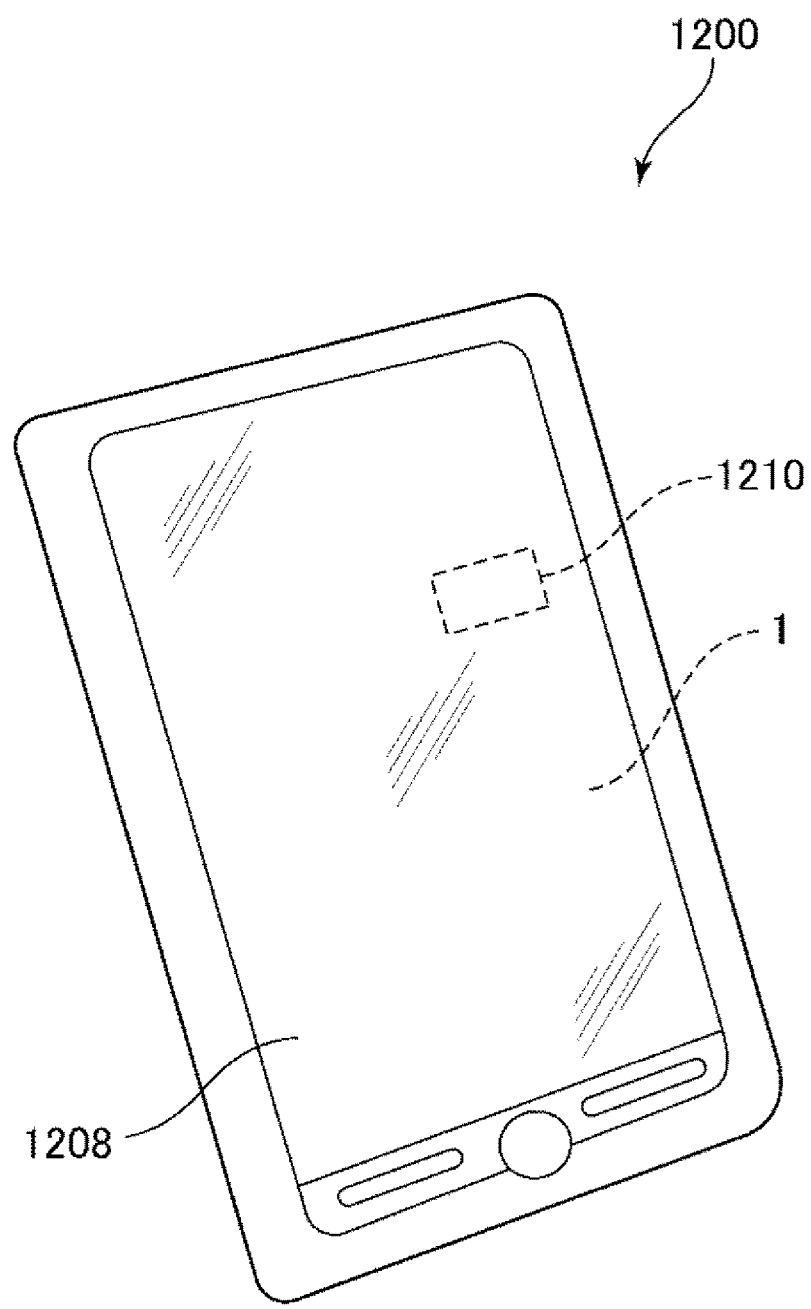
FIG. 3 is a plan view showing a smartphone as an electronic instrument according to a second embodiment.

FIG. 3 is a plan view showing a smartphone as the electronic instrument according to a second embodiment.

A smartphone 1200 shown in FIG. 3 is a smartphone based as an example on the electronic instrument according to the present disclosure. The smartphone 1200 accommodates the inertial sensor 1 and a control circuit 1210, which performs control based on a detection signal outputted from the inertial sensor 1. Detection data detected by the inertial sensor 1 is transmitted to the control circuit 1210, and the control circuit 1210 recognizes the attitude and behavior of the smartphone 1200 based on the received detection data and can change an image displayed on a display section 1208, issue an alarm sound or an effect sound, and drive a vibration motor to vibrate the main body of the smartphone 1200.

The thus configured smartphone 1200 as the electronic instrument includes the inertial sensor 1 and the control circuit 1210, which performs control based on the detection signal outputted from the inertial sensor 1. The smartphone 1200 can therefore benefit from the above-mentioned effects provided by the inertial sensor 1 and hence have high reliability.

The electronic instrument according to the present disclosure is not limited to the smartphone 1200 described above and can, for example, be a personal computer, a digital still camera, a tablet terminal, a timepiece, a smartwatch, an inkjet printer, a laptop personal computer, a television receiver, smart glasses, a wearable terminal, such as a head mounted display (HMD), a video camcorder, a video tape recorder, a car navigator, a drive recorder, a pager, an electronic notepad, an electronic dictionary, an electronic translator, a desktop calculator, an electronic game console, a toy, a word processor, a workstation, a TV phone, a security television monitor, electronic binoculars, a POS terminal, a medical instrument, a fish finder, a variety of measuring instruments, an instrument for a mobile terminal base station, a variety of meters for car, railway car, airplane, helicopter, and ship, a flight simulator, and a network server.

Third Embodiment

Figure 4:
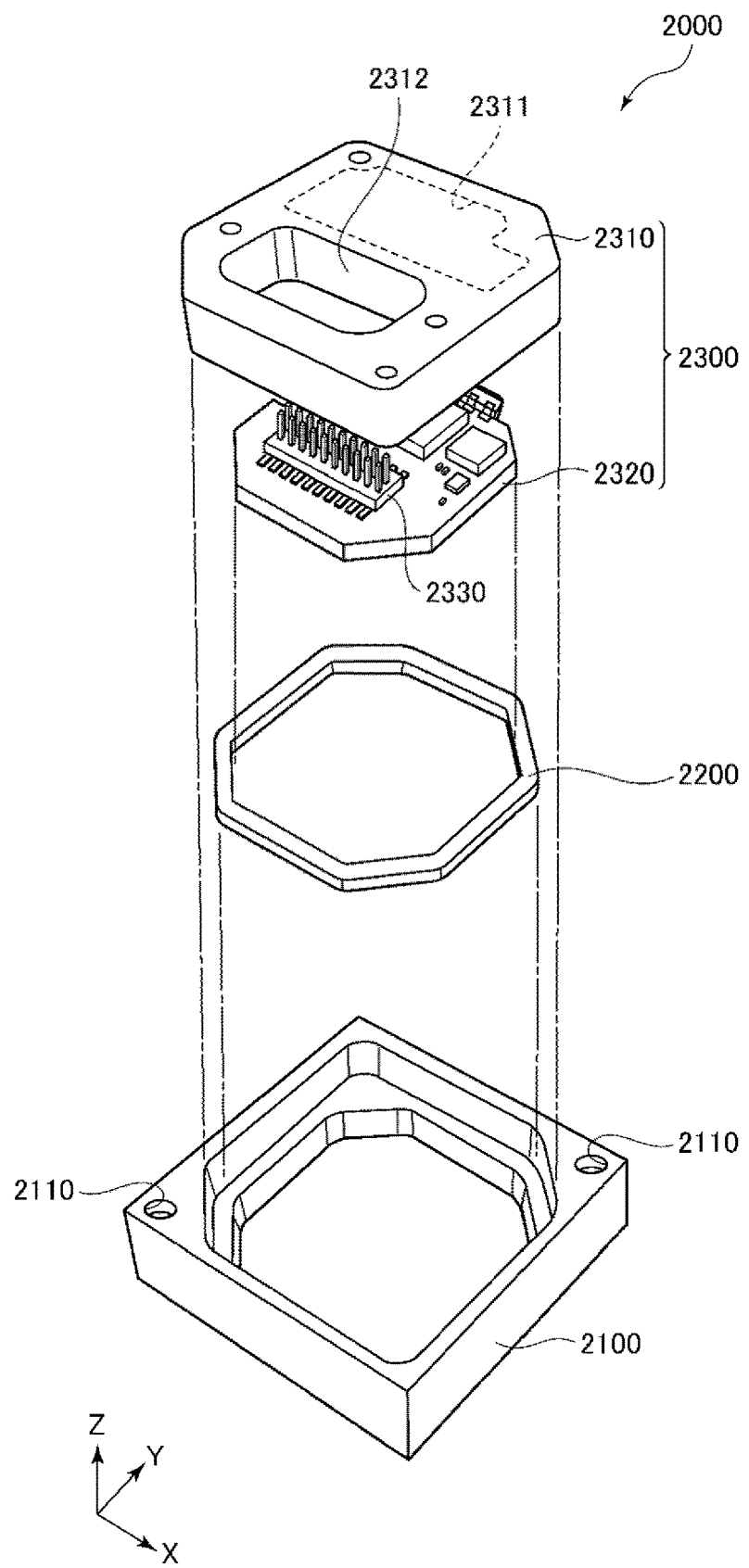
FIG. 4 is an exploded perspective view showing an inertial measurement unit as the electronic instrument according to a third embodiment.
Figure 5:
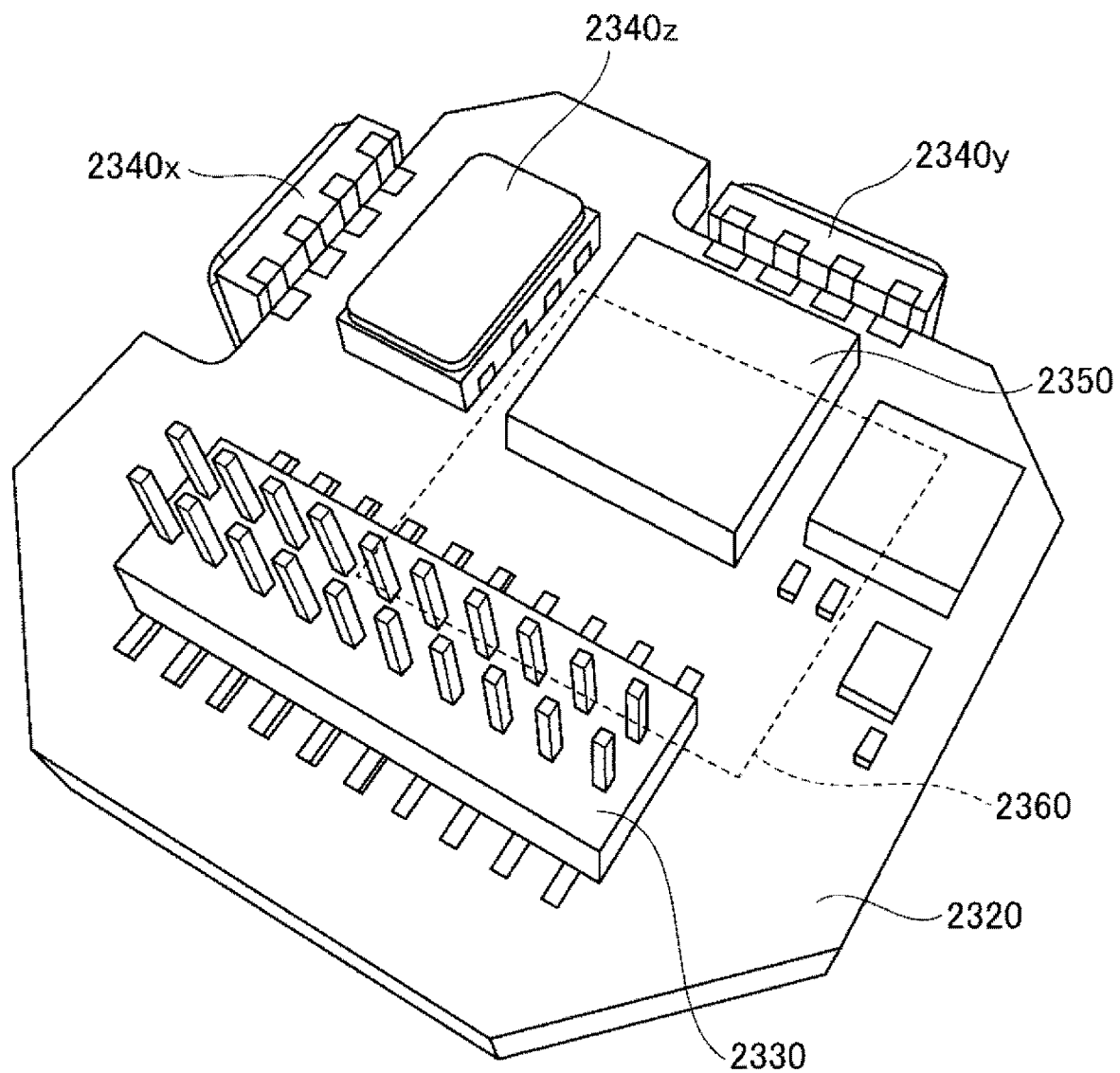
FIG. 5 is a perspective view of a substrate provided in the inertial measurement unit shown in FIG. 4.

FIG. 4 is an exploded perspective view showing an inertial measurement unit as the electronic instrument according to a third embodiment. FIG. 5 is a perspective view of a substrate provided in the inertial measurement unit shown in FIG. 4.

An inertial measurement unit 2000 (IMU) as the electronic instrument shown in FIG. 4 is an inertial measurement unit that detects the attitude and behavior of an apparatus to which the inertial measurement unit 2000 is attached, such as an automobile and a robot. The inertial measurement unit 2000 functions as a six-axis motion sensor including a three-axis acceleration sensor and a three-axis angular velocity sensor.

The inertial measurement unit 2000 is a rectangular parallelepiped unit having a substantially square shape in the plan view. Threaded holes 2110 as fixing sections are formed in the vicinity of two vertices of a square body that are vertices located on a diagonal of the square. Two screws screwed into the two threaded holes 2110 can fix the inertial measurement unit 2000 to an attachment surface of the apparatus to which the inertial measurement unit 2000 is attached, such as an automobile. The inertial measurement unit 2000 can be so reduced in size as to be incorporated, for example, in a smartphone and a digital camera by part selection and design change.

The inertial measurement unit 2000 includes an outer enclosure 2100, a bonding member 2200, and a sensor module 2300, and the sensor module 2300 is inserted into the outer enclosure 2100 via the bonding member 2200. The outer shape of the outer enclosure 2100 is a rectangular parallelepiped having a substantially square shape in the plan view, as is the overall shape of the inertial measurement unit 2000 described above. The threaded holes 2110 are formed in the vicinity of two vertices of the square outer enclosure 2100 that are vertices located on a diagonal of the square. The outer enclosure 2100 has a box-like shape, and the sensor module 2300 is accommodated in the outer enclosure 2100.

The sensor module 2300 includes an inner enclosure 2310 and a substrate 2320. The inner enclosure 2310 is a member that supports the substrate 2320 and is so shaped as to be accommodated in the outer enclosure 2100. The inner enclosure 2310 has a recess 2311, which prevents the inner enclosure 2310 from coming into contact with the substrate 2320, and an opening 2312, which exposes a connector 2330, which will be described later. The thus configured inner enclosure 2310 is bonded to the outer enclosure 2100 via the bonding member 2200. The substrate 2320 is bonded to the lower surface of the inner enclosure 2310 with an adhesive.

The connector 2330, an angular velocity sensor 2340z, which detects angular velocity around the axis Z, an acceleration sensor 2350, which detects acceleration in the axes X, Y, and Z, and other components are mounted on the upper surface of the substrate 2320, as shown in FIG. 5. An angular velocity sensor 2340x, which detects angular velocity around the axis X, and an angular velocity sensor 2340y, which detects angular velocity around the axis Y, are mounted on the side surface of the substrate 2320. Any of the inertial sensors according to the present disclosure can be used as the acceleration sensor 2350.

A control IC 2360 is mounted on the lower surface of the substrate 2320. The control IC 2360 is a micro controller unit (MCU) and controls each portion of the inertial measurement unit 2000. A storage stores a program that specifies the order and content for detecting the acceleration and angular velocity, a program that digitizes detected data and incorporates the digitized data in packet data, data associated with the programs, and other pieces of information. A plurality of other electronic parts are also mounted on the substrate 2320.

Fourth Embodiment

Figure 6:
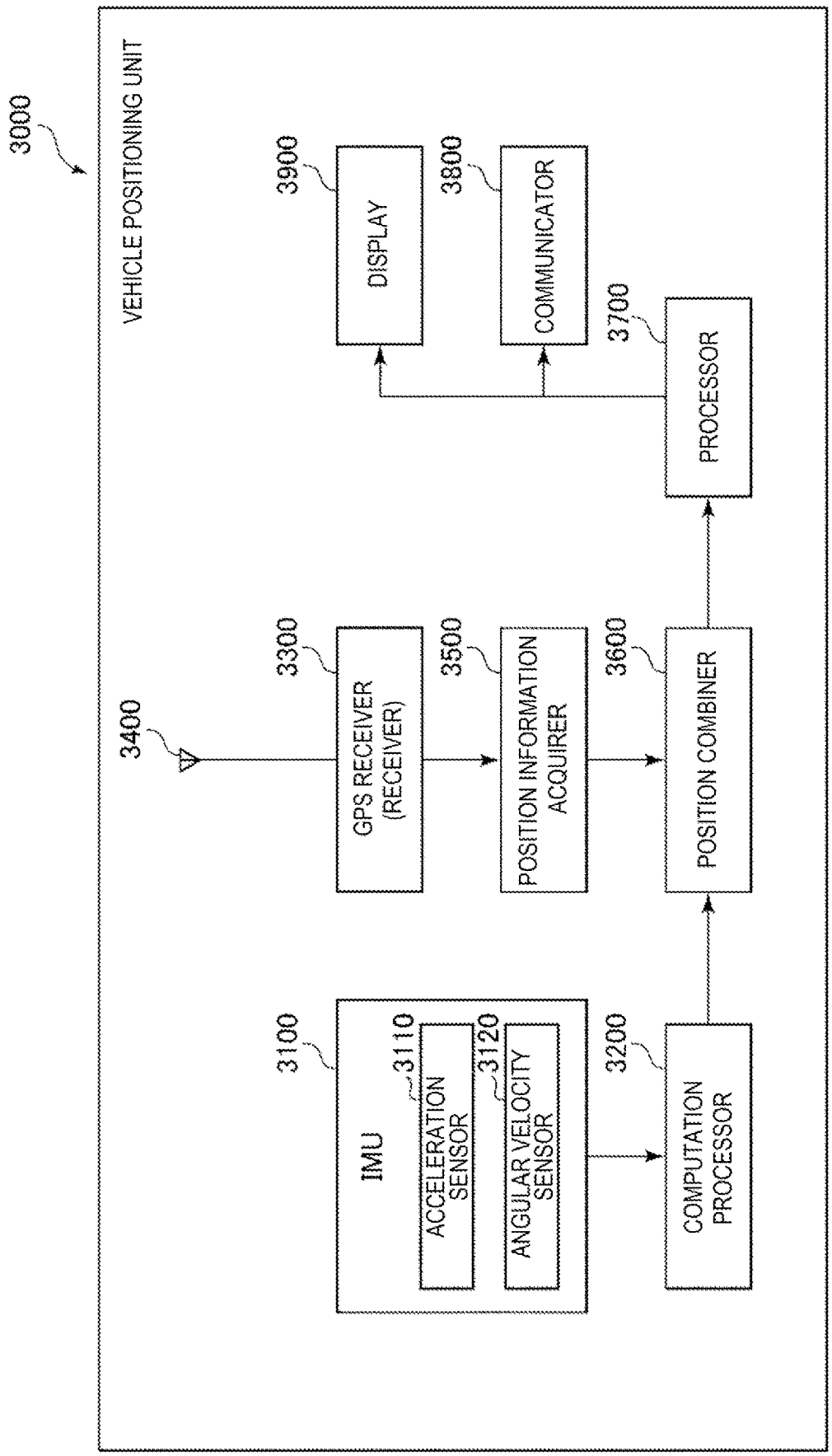
FIG. 6 is a block diagram showing the overall system of a vehicle positioning unit as the electronic instrument according to a fourth embodiment.
Figure 7:
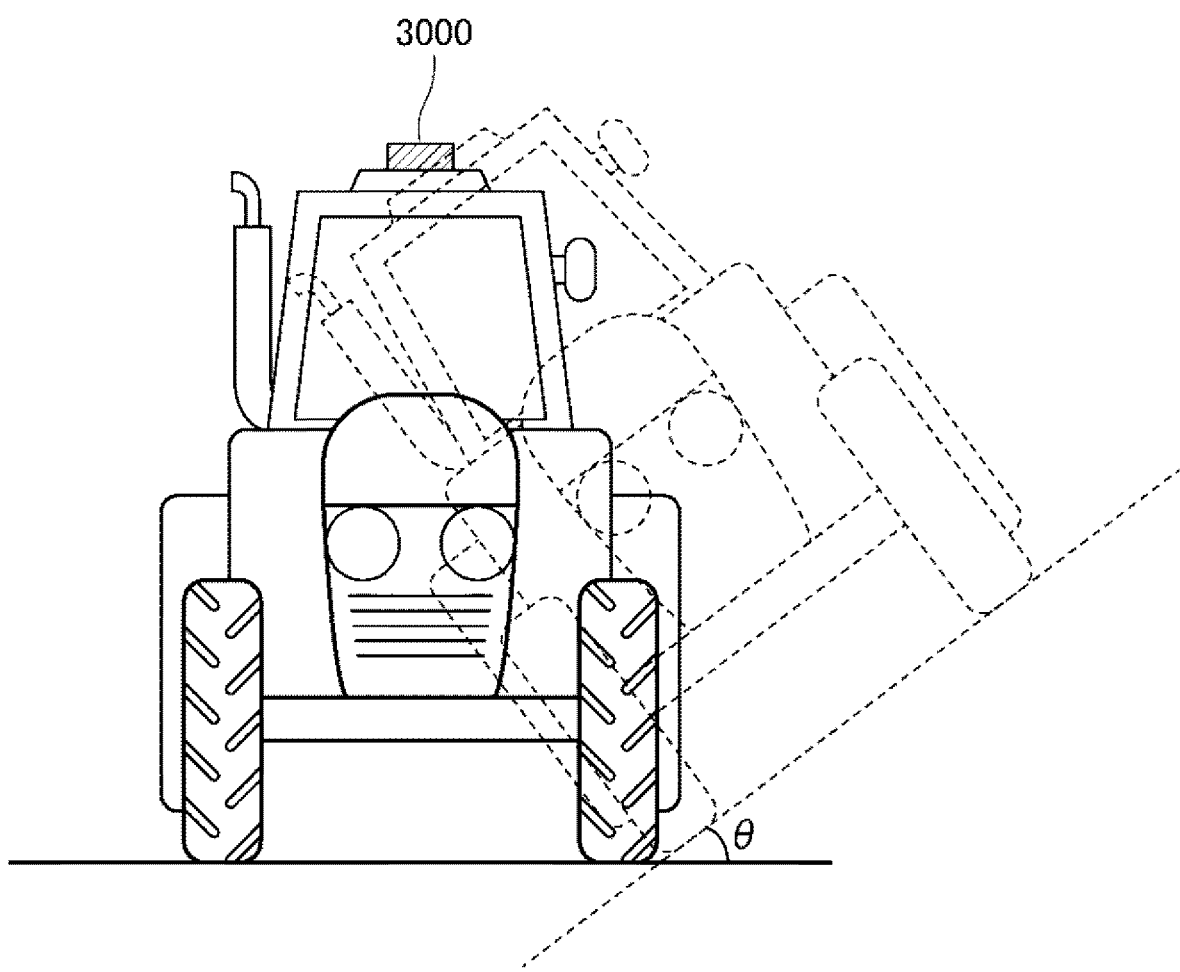
FIG. 7 shows an effect of the vehicle positioning unit shown in FIG. 6.

FIG. 6 is a block diagram showing the overall system of a vehicle positioning unit as the electronic instrument according to a fourth embodiment. FIG. 7 shows an effect of the vehicle positioning unit shown in FIG. 6.

A vehicle positioning unit 3000 shown in FIG. 6 is a unit that is attached to a vehicle when used and measures the position of the vehicle. The vehicle is not limited to a specific vehicle and may be any of a bicycle, an automobile, an autocycle, a train, an airplane, a ship, and other vehicles, and the present embodiment will be described with reference to a case where a four-wheeled automobile, particularly, an agricultural tractor is used as the vehicle.

The vehicle positioning unit 3000 includes an inertial measurement unit 3100 (IMU), a computation processor 3200, a GPS receiver 3300, a reception antenna 3400, a position information acquirer 3500, a position combiner 3600, a processor 3700, a communicator 3800, and a display 3900. The inertial measurement unit 3100 can, for example, be the inertial measurement unit 2000 described above.

The inertial measurement unit 3100 includes a three-axis acceleration sensor 3110 and a three-axis angular velocity sensor 3120. The computation processor 3200 receives acceleration data from the acceleration sensor 3110 and angular velocity data from the angular velocity sensor 3120, performs inertial navigation computation on the data, and outputs inertial navigation positioning data containing the acceleration and attitude of the vehicle.

The GPS receiver 3300 receives signals from GPS satellites via the reception antenna 3400. The position information acquirer 3500 outputs GPS positioning data representing the position (latitude, longitude, and altitude), velocity, and orientation of the vehicle positioning unit 3000 based on the signals received by the GPS receiver 3300. The GPS positioning data also contains status data representing the reception state, the reception time, and other pieces of information.

The position combiner 3600 calculates the position of the vehicle, specifically, the position on the ground along which the vehicle is traveling based on the inertial navigation positioning data outputted from the computation processor 3200 and the GPS positioning data outputted from the position information acquirer 3500. For example, even when the positions of the vehicle contained in the GPS positioning data are equal to one another, but the vehicle has a different attitude due to inclination e of the ground and other factors, as shown in FIG. 7, the position on the ground along which the vehicle is traveling varies. An accurate position of the vehicle cannot therefore be calculated based only on the GPS positioning data. In this case, the position combiner 3600 uses the inertial navigation positioning data to calculate the position on the ground along which the vehicle is traveling.

The processor 3700 performs predetermined processing on position data outputted from the position combiner 3600, and the processed data is displayed as the result of the positioning on the display 3900. The position data may be transmitted via the communicator 3800 to an external apparatus.

Fifth Embodiment

Figure 8:
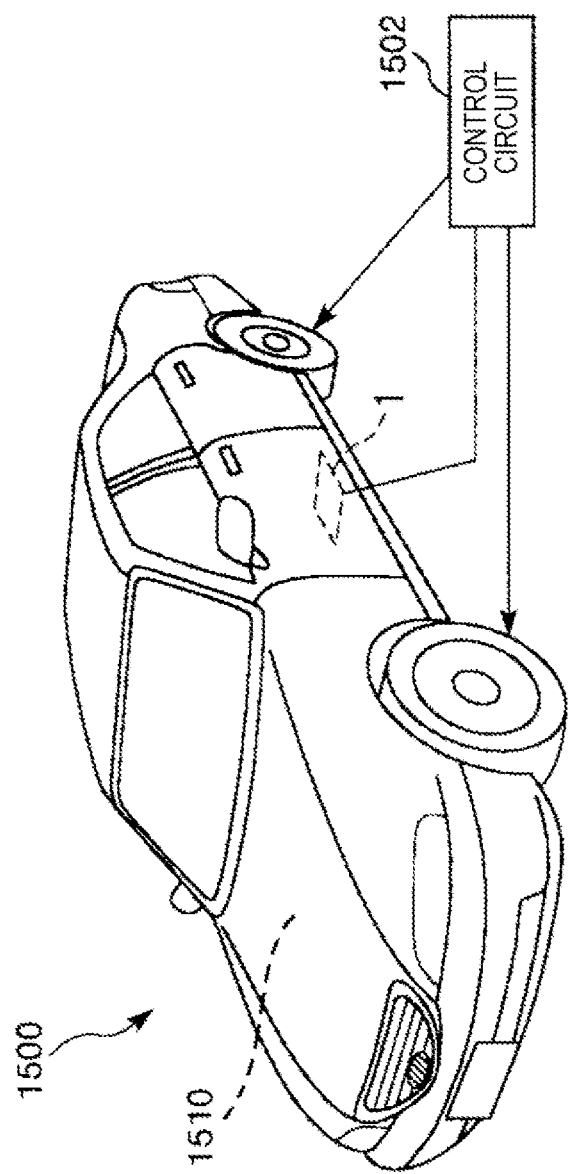
FIG. 8 is a perspective view showing a vehicle according to a fifth embodiment.

FIG. 8 is a perspective view showing a vehicle according to a fifth embodiment.

An automobile 1500 shown in FIG. 8 is an automobile based on the vehicle according to the present disclosure. In FIG. 8, the automobile 1500 includes a system 1510, which is at least any of an engine system, a brake system, and a keyless entry system. The inertial sensor 1 is built in the automobile 1500 and can detect the attitude of the vehicle body. The detection signal from the inertial sensor 1 is supplied to a control circuit 1502, which can control the system 1510 based on the signal.

As described above, the automobile 1500 as the vehicle includes the inertial sensor 1 and the control circuit 1502, which performs control based on the detection signal outputted from the inertial sensor 1. The automobile 1500 can therefore benefit from the above-mentioned effects provided by the inertial sensor 1 and hence have high reliability.

The inertial sensor 1 can also be widely used with a car navigation system, a car air conditioner, an anti-lock braking system (ABS), an airbag, a tire pressure monitoring system (TPMS), an engine control system, and an electronic control unit (ECU) that monitors or otherwise observes a battery in a hybrid automobile and an electric automobile. The vehicle is not limited to the automobile 1500 and may instead, for example, be a railway car, an airplane, a helicopter, a rocket, an artificial satellite, a ship, an automated guided vehicle (AGV), an elevator, an escalator, a radio control model, a railway mode, and other toys, a bipedal walking robot, and a drone or any other unmanned airplane.

The inertial sensor, the electronic instrument, and the vehicle according to the present disclosure have been described above based on the embodiments in the drawings, but the present disclosure is not limited thereto, and the configuration of each portion can be replaced with an arbitrary configuration having the same function. Further, another arbitrarily constituent part may be added to the present disclosure. The embodiments described above may be combined with each other as appropriate.

What is claimed is:
1. An inertial sensor comprising:
provided that axes X, Y, and Z are three axes perpendicular to one another,
a substrate;
a movable element that swings around a swing axis extending along the axis Y; and
an electrode that is disposed on the substrate and overlaps with the movable element in a plan view along the axis-Z direction,
wherein the movable element includes a first movable section and a second movable section so provided as to sandwich the swing axis in the plan view along the axis-Z direction,
the first movable section includes a symmetrical section that is so provided that the symmetrical section and the second movable section are symmetrical with respect to the swing axis in the plan view along the axis-Z direction and an asymmetrical section that is farther from the swing axis than the symmetrical section, with rotational moment of the first movable section around the swing axis being greater than rotational moment of the second movable section around the swing axis,
the electrode includes a first detection electrode that is so provided as to overlap with the symmetrical section of the first movable section in the plan view along the axis-Z direction and a first dummy electrode that is so provided as to overlap with the symmetrical section and the asymmetrical section of the first movable section on a side farther from the swing axis than the first detection electrode and has the same potential as potential at the movable element,
the symmetrical section has a first opening provided in a first section that overlaps with the first detection electrode in the plan view along the axis-Z direction and a second opening provided in a second section that overlaps with the first dummy electrode in the plan view along the axis-Z direction, and
an opening ratio of the first opening to the first section is smaller than an opening ratio of the second opening to the second section.
2. The inertial sensor according to claim 1,
wherein the electrode includes a second detection electrode that is so provided as to overlap with the second movable section in the plan view along the axis-Z direction and a second dummy electrode that is so provided as to overlap with the second movable section on a side farther from the swing axis than the second detection electrode and has the same potential as the potential at the movable element, the second movable section includes a third opening provided in a third section that overlaps with the second detection electrode in the plan view along the axis-Z direction and a fourth opening provided in a fourth section that overlaps with the second dummy electrode in the plan view along the axis-Z direction, and an opening ratio of the third opening to the third section is smaller than an opening ratio of the fourth opening to the fourth section.

3. The inertial sensor according to claim 2,
wherein the first opening and the third opening are provided symmetrically with respect to the swing axis, and the second opening and the fourth opening are provided symmetrically with respect to the swing axis.

4. The inertial sensor according to claim 1,
wherein the asymmetrical section has a fifth opening, and
an opening ratio of the fifth opening to the asymmetrical section is smaller than an opening ratio of the second opening to the second section.

5. The inertial sensor according to claim 4, wherein the opening ratio of the fifth opening to the asymmetrical section is smaller than an opening ratio of the first opening to the first section.

6. The inertial sensor according to claim 1,
wherein a separation distance from the asymmetrical section to the substrate is greater than a separation distance from the symmetrical section to the substrate.

7. An electronic instrument comprising:
the inertial sensor according to claim 1; and
a control circuit that performs control based on a detection signal outputted from the inertial sensor.

8. A vehicle comprising:
the inertial sensor according to claim 1; and
a control circuit that performs control based on a detection signal outputted from the inertial sensor.

9. An inertial sensor comprising:
a substrate;
a movable element that swings around a swing axis, the movable element including:
a first movable section having a first section, a second section that is farther from the swing axis than the first section, and a third section disposed between the first section and second section;
a second movable section;
a first detection electrode disposed on the substrate so as to overlap with the first section of the first movable section in the plan view;
a first dummy electrode disposed on the substrate so as to overlap with the second section and the third section of the first movable section in the plan view, wherein the first section of the first movable section has a first opening, the third section of the first movable section has a second opening, and an opening ratio of the first opening to the first section of the first movable section is smaller than an opening ratio of the second opening to the third section of the first movable section.

10. The inertial sensor according to claim 9, further including:
a second detection electrode disposed on the substrate;
a second dummy electrode disposed on the substrate,
wherein the second movable section includes a fourth section and a fifth section that is farther from the swing axis than the fourth section, wherein the fourth section of the second movable section has a third opening and is provided so as to overlap with the second detection electrode, the fifth section of the second movable section has a fourth opening and is provided so as to overlap with the second dummy electrode, and an opening ratio of the third opening to the fourth section of the second movable section is smaller than an opening ratio of the fourth opening to the fifth section of the second movable section.

11. The inertial sensor according to claim 9,
wherein the first opening and the third opening are provided symmetrically with respect to the swing axis, and the second opening and the fourth opening are provided symmetrically with respect to the swing axis.

12. The inertial sensor according to claim 9,
wherein the second section of the first movable section has a fifth opening, and an opening ratio of the fifth opening to the asymmetrical section is smaller than an opening ratio of the second opening to the second section.

13. The inertial sensor according to claim 12, wherein the opening ratio of the fifth opening to the second section is smaller than an opening ratio of the first opening to the first section.

14. An electronic instrument comprising:
the inertial sensor according to claim 9; and
a control circuit that performs control based on a detection signal outputted from the inertial sensor.

15. A vehicle comprising:
the inertial sensor according to claim 9; and
a control circuit that performs control based on a detection signal outputted from the inertial sensor.

* * * * *